(12) United States Patent
Farhadi (10) Patent No.: US 9,386,118 B2
(45) Date of Patent: Jul. 5, 2016

(54) ONLINE PROGRESSIVE CONTENT PLACEMENT IN A CONTENT CENTRIC NETWORK

(71) Applicant: FUJITSU LIMITED, Kawasaki-shi, Kanagawa (JP)

(72) Inventor: Golnaz Farhadi, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 68 days.

(21) Appl. No.: 14/510,967

(22) Filed: Oct. 9, 2014

(65) Prior Publication Data

US 2016/0105524 A1    Apr. 14, 2016

(51) Int. Cl.
*H04L 12/50*     (2006.01)
*H04L 29/08*     (2006.01)
*H04L 12/861*    (2013.01)

(52) U.S. Cl.
CPC ............ *H04L 67/2842* (2013.01); *H04L 49/90* (2013.01)

(58) Field of Classification Search
CPC ... H04L 67/2842; H04L 49/90; H04L 41/069; H04Q 11/06; H04Q 11/04; H04Q 11/08
USPC .......................... 370/371, 374, 378, 381, 389
See application file for complete search history.

(56) References Cited

U.S. PATENT DOCUMENTS

| | | | |
|---|---|---|---|
| 6,952,712 B2 * | 10/2005 | Yoshimura | G06F 17/30902 707/E17.12 |
| 7,032,073 B2 * | 4/2006 | Mizrachi | G06F 12/0842 711/119 |
| 8,694,675 B2 | 4/2014 | Wang et al. | |
| 9,047,235 B1 * | 6/2015 | Barraclough | G06F 17/30772 |

OTHER PUBLICATIONS

Lim, Sung-Haw et al. "Inter-Chunk Popularity-Based Edge-First Caching in Concent-Centric Networking." IEEE Communications Letters, vol. 18, No. 8, Aug. 2014. https://www.scribd.com/doc/239275190/Inter-Chunk-Popularity-Based-Edge-First-Caching.
V. Jacobson et al., "Networking Named Content" Networking Named Content, CONEXT Dec. 1-4, 2009.
CCNx protocol, http://www.ccnx.org/releases/latest/doc/technical/CCNxProtocol.html, retrieved on Oct. 23, 2014.
S. Lederer et al., "Dynamic Adaptive Streaming over HTTP Dataset" Feb. 22-24, 2012.
K. Cho et al,. Wave: Popularity-based and Collaborative In-network Caching for Content-Oriented Networks, Infocom Workshop 2012.

* cited by examiner

*Primary Examiner* — Brenda H Pham
(74) *Attorney, Agent, or Firm* — Maschoff Brennan (57) ABSTRACT

A method for content placement along the delivery path of a network of nodes in a content centric network includes receiving first and second interest packets from a downstream node, checking a content cache of a first node for the first and second data packets and, in response to the first and second data packets being absent from the content cache, checking a pending interest table of the first node for the first and second interest packets. The method also includes, in response to the first and second interest packets being absent from the pending interest table of the first node and a cache flag of the first interest packet received from the downstream node being off, performing various operations to cause the first data packet to be cached in the content cache of the first node.

20 Claims, 7 Drawing Sheets

ONLINE PROGRESSIVE CONTENT PLACEMENT IN A CONTENT CENTRIC NETWORK

FIELD

The implementations discussed herein are related to content placement in a content centric network.

BACKGROUND

Unless otherwise indicated herein, the materials described herein are not prior art to the claims in the present application and are not admitted to be prior art by inclusion in this section.

While present Internet structures are host-oriented and configured based on a one-to-one paradigm, a majority of current Internet uses, such as viewing and sharing videos, music, photographs, documents, and more, may have a data or content centric aspect different from a host centric aspect. Content centric networks (CCNs), in which endpoints communicate based on named data instead of Internet Protocol (IP) addresses, have evolved as an alternative to the host-oriented Internet architecture.

The subject matter claimed herein is not limited to implementations that solve any disadvantages or that operate only in environments such as those described above. Rather, this background is only provided to illustrate one example technology area where some implementations described herein may be practiced.

SUMMARY

According to an aspect of an implementation, a method for content placement along the delivery path of a network of nodes in a content centric network includes receiving first and second interest packets from a downstream node. The method also includes checking a content cache of a router for the first and second data packets. The method also includes, in response to the first and second data packets being absent from the content cache, checking a pending interest table of the router for the first and second interest packets. The method also includes, in response to the first and second interest packets being absent from the pending interest table of the router and a cache flag of the first interest packet received from the downstream node being off: recording the first and second interest packets in the pending interest table; setting a cache flag of the first interest packet in the pending interest table; forwarding the first and second interest packets to an upstream node with a cache flag in the first interest packet set to indicate that the first data packet identified by the first interest packet will be cached in the content cache of the router; receiving the first and second data packets from the upstream node; and caching the first data packet in the content cache of the router. The method also includes determining, based on the count value, a number of data packets of the content to be stored in the content cache.

The object and advantages of the implementations will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example implementations will be described and explained with additional specificity and detail through the use of the accompanying drawings in which.

DESCRIPTION OF IMPLEMENTATIONS

There has been increased demand for streaming video and audio on the Internet in recent years. Streaming of video, audio, Video on Demand, and similar services requires delivery of a large amount of data to users, which may lead to congestion and high user delay. Accordingly, some implementations described herein relate to a CCN architecture and supporting communication protocols capable of quickly delivering data to the user and reducing network traffic.

In a CCN, a content file may consist of a number of chunks or pieces, generically referred to herein as data packets. Some data packets of a content file may be requested more frequently than other data packets of the content file. For example, data packets corresponding to a beginning of a video may be requested more frequently than data packets corresponding to a middle and/or end of the video. Improved performance may be gained via a CCN scheme in which caching or storage of first data packets of a content at nodes close to the user is prioritized, and as the popularity of a content file increases, the number of data packets of the content cached at nodes close to the user is increased. Such a scheme may also reduce caching of redundant replicas throughout the CCN if a content file is not popular.

Some implementations described herein relate to content placement along the delivery path of a network of nodes (e.g., in a CCN) that favor storage of the first data packets of a content in nodes close to the user and increase the number of pieces of a content stored in nodes close to the user as requests for the content increase.

Implementations of the present invention will be explained with reference to the accompanying drawings.

Figure 1:
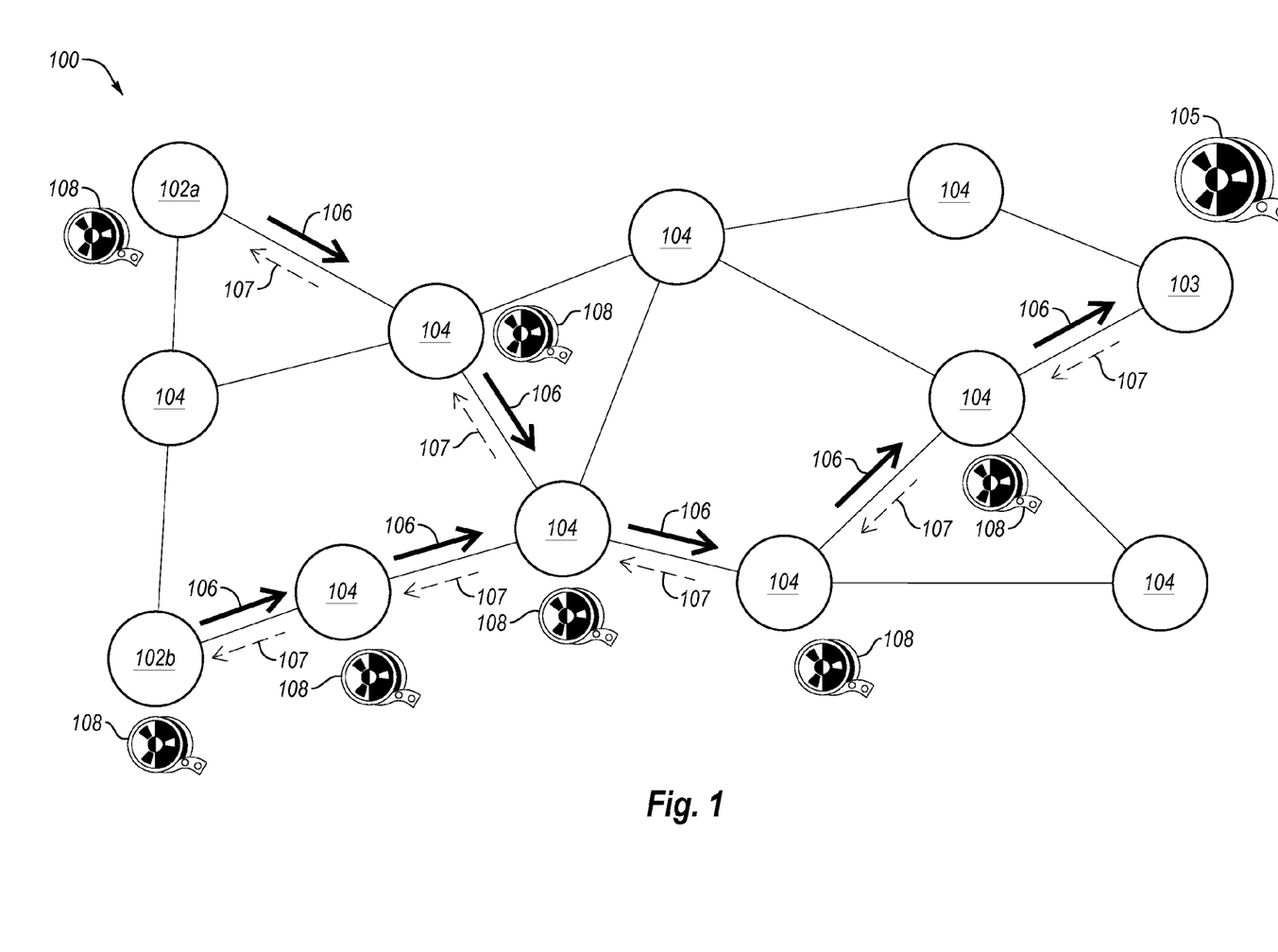
FIG. 1 is a schematic diagram of an example CCN in which some implementations may be implemented.

FIG. 1 is a schematic diagram of an example CCN 100, arranged in accordance with at least one implementation described herein. The CCN 100 may include a network of nodes configured to route messages, which may also be referred to as "interest packets," and to deliver data packets. The term "interest packet" may refer to a request for a piece or chunk of content. The term "data packet" may refer to a piece or chunk of content. Each interest packet may correspond to one of multiple data packets that collectively form a content 105 hosted at a content source node 103. Although a single content 105 is illustrated in FIG. 1, more generally the CCN 100 may include multiple different contents 105, each of which may include multiple data packets that may be requested by a corresponding interest packet.

In various implementations, the CCN 100 may include or may be included in the Internet or a portion thereof. It will be appreciated, with the benefit of the present disclosure, that the CCN 100 illustrated in FIG. 1 may constitute, in some respects, a simplification. For example, the CCN 100 may include numerous additional network nodes, such as clients, servers, routers, switches, and/or other network devices. As illustrated in FIG. 1, the CCN 100 may include a number of network nodes, including two user nodes 102a, 102b (generically "user node 102" or "user nodes 102"), one content source node 103, and nine intermediate nodes 104. In other implementations, the CCN 100 may include different numbers of user nodes 102, content source nodes 103, and/or intermediate nodes 104 than are illustrated in FIG. 1.

As shown, intermediate nodes 104 may interconnect the user nodes 102 and the content source node 103, such that interest packets and data packets may be exchanged between these nodes. The user nodes 102 may be considered to be downstream from the intermediate nodes 204, which may be considered to be downstream from the content source node 103.

Each intermediate node 104 may include a router. The term "router" may refer to any network device capable of receiving and forwarding interest packets and/or receiving and forwarding data packets.

The content source node 103 may include a server. The term "server" may refer to any device capable of receiving interest packets and serving data packets. The content source node 103 may host the content 105, or more generally one or more different contents 105, each content 105 being identified by at least one content name.

Each of the user nodes 102 may be any device capable of requesting and receiving content via a network, e.g., by sending interest packets and receiving data packets. Each of the user nodes 102 may include a client device, such as a desktop computer, a laptop computer, a tablet computer, a mobile phone, a smartphone, a personal digital assistant (PDA), a wearable device, or other client device.

The user node 102 may request the delivery of any of the contents 105 by sending the corresponding interest packets, which may then be routed by one or more of the intermediate nodes 104 to the appropriate source node 103. In FIG. 1, the routing of interest packets from the user nodes 102 to the content source node 103 is generally denoted at 106. Routing for the interest packets may be performed based on the name of the content requested, which may be found in the interest packets. The content source node 103 may use the interest packets to locate the appropriate content and transmit the corresponding data packets back to the user node via intermediate nodes 104 located along a delivery path 107. Moreover, as illustrated in the CCN 100 of FIG. 1, data packets 108 that make up at least some of the content 105 may be placed in-network at some or all of the intermediate nodes 104 along the delivery path to provide faster, more efficient delivery to the user node 102 and to improve user experience.

In these and other implementations, the data packets 108 may be diffused throughout the CCN 100 closer to the user nodes 102 with increasing popularity of the corresponding content 105. For example, for two different contents 105, the content 105 that is relatively more popular may have more data packets 108 corresponding to more of the content 105 cached at intermediate nodes 106 closer to the user nodes 102 than the content 105 that is relatively less popular. To implement the foregoing, each of the intermediate nodes 104 may include a pending interest table (PIT), a forwarding information base (FIB), and a content cache (CC) to perform routing, delivery, and storage tasks, including recording of interest packets. The PIT, FIB, and CC are explained in more detail with respect to FIG. 2A.

Figure 2A:
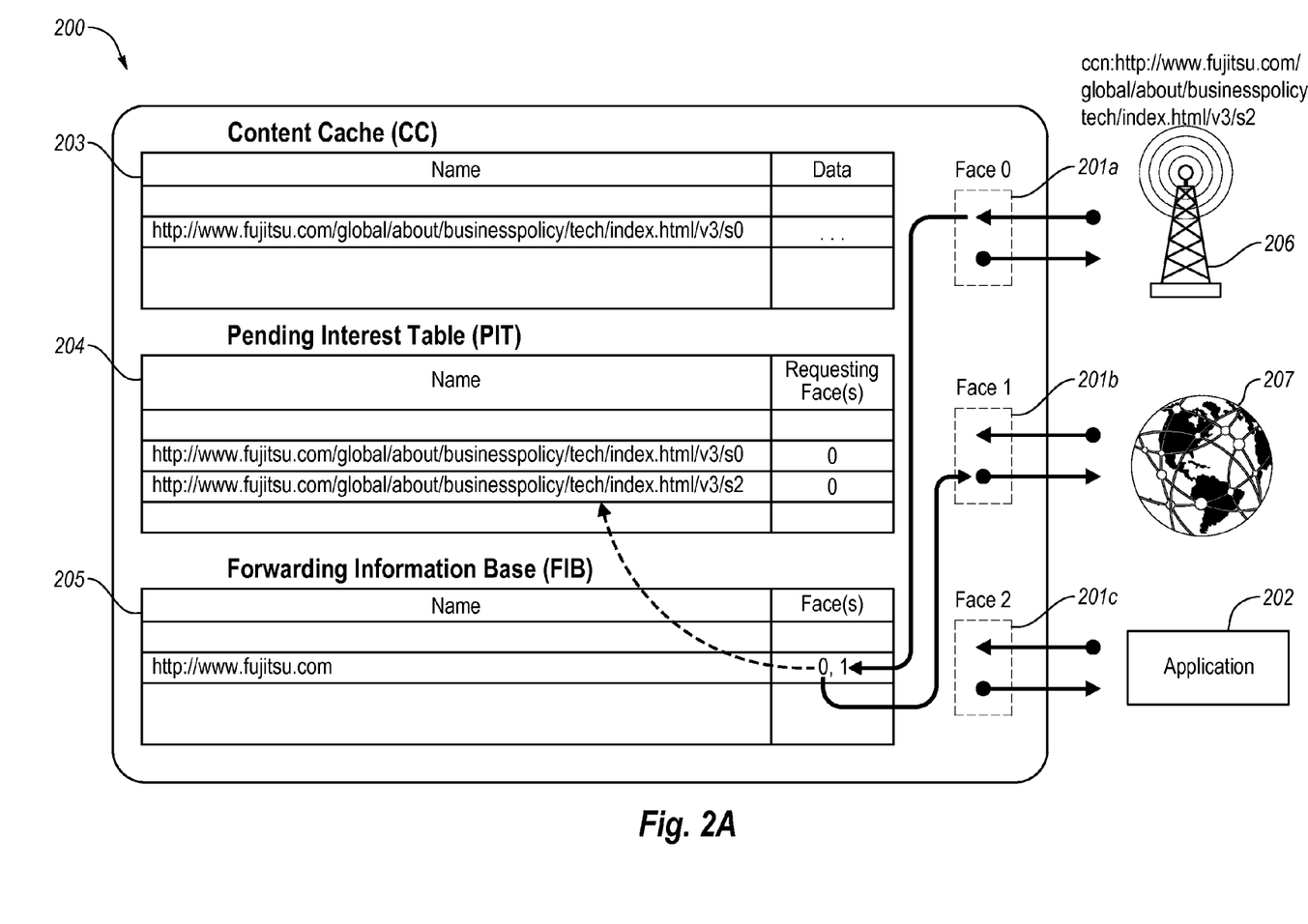
FIG. 2A is a schematic diagram of the architecture of a typical CCN router.

FIG. 2A is a schematic diagram of the architecture of a typical CCN router 200, arranged in accordance with at least one implementation described herein. Each user node 102 and intermediate node 104 of FIG. 1 may include a CCN router 200. The router 200 may include multiple ports or interfaces 201a-201c (e.g. Face 0, Face 1, Face 2, . . . ) and multiple forwarding tables or data structures 203-205 (collectively "data structures 203-205") for properly handling content data forwarding in the CCN.

The interfaces 201a-201c (hereinafter generically "interface 201" or "interfaces 201") may be coupled to one or more user nodes (not shown), intermediate nodes, content source nodes, and/or to one or more services or applications, via fixed (wired) links, wireless links, networks, Internet, and/or other components or systems. For example, a first interface 201a (Face 0) may be coupled to a downstream intermediate node or user node 206 (hereinafter "downstream node 206"). A second interface 201b (Face 1) may be coupled to an upstream intermediate node or content source node 207 (hereinafter "upstream node 207"). A third interface 201c may be coupled to the one or more services or applications 202.

The router 200 may include the data structures 203-205, including a CC 203, a PIT 204, and a FIB 205. The CC 203 may associate interest packets with corresponding data packets. For example, CC 203 may include a "Name" column that indicates each received interest packet and a "Data" column that indicates the corresponding data packet, which may have been received and cached at the router 200. The PIT 204 may record and keep track of each received interest packet that is being served or pending (until the corresponding requested data packet is received) by associating each interest packet with one or more receiving interfaces 201. For example, the PIT 204 may include a "Prefix" column that indicates each interest packet and a "Requesting Face(s)" column that indicates one or more receiving interfaces 201 for the interest packet. The FIB 205 may associate each interest packet with corresponding interfaces 201 on which the interest packet may be forwarded. For example, the FIB 205 may include a "Prefix" column that indicates each interest packet and a "Face(s)" column that indicates the corresponding forwarding interfaces 201.

An interest packet may be received at the first interface 201a (Face 0) from a user node or intermediate node (not shown). The interest packet may include a name prefix indicating the requested content or data packet and may be forwarded to or processed at the CC 203. An entry may be made in the CC 203 for the received interest packet using the indicated name prefix when the corresponding data packet arrives and is cached at the CCN router 200. The name prefix may be entered in a new or empty row of the CC 203 under the "name" column.

If the data packet is absent from the CC 203, the interest packet may then be forwarded to or processed at the PIT 204. An entry may be made in the PIT 204 for the receiving interest packet using the indicated name prefix. The first interface 201a (Face 0) may be indicated in the same entry. The name prefix may be entered in a new or empty row of the PIT 201 under the "Prefix" column, and Face 0 may be indicated in the same row under the "Requesting Faces" column.

The interest packet may then be forwarded to or processed at the FIB 205. An entry may be made in the FIB 205 for the received interest packet using the indicated name prefix. The first interface 201a (Face 0) may also be indicated in the same entry. The interest packet may then be forwarded on the interface 201b (Face 1), e.g., to the upstream node 207.

When a requested data packet is received, e.g., from the upstream node 207 via the second interface 201b (Face 1), the name prefix indicated in the received data packet may be matched with a corresponding entry in the PIT 204. Accordingly, the data packet may be forwarded on the first interface(s) 201a (Face 0) indicated in the "Requesting Faces" column of the matched entry. The data packet may or may not be stored according to a caching criteria or scheme, as described below.

In some implementations, interest packets communicated to and/or from the CCN router 200 and/or within the CCN 100 of FIG. 1 may each include a cache flag. When a cache flag of an interest packet is set or on, this may be used to indicate to an upstream node that a downstream node is going to cache a corresponding data packet identified by the interest packet. When a cache flag of an interest packet is not set or is off, this may be used to indicate to an upstream node that a downstream node is not going to cache a corresponding data packet identified by the interest packet.

When the CCN router 200 receives an interest packet for a data packet that is not being cached by a downstream node and that is not cached at the CCN router 200, the CCN router 200 may set the cache flag of the interest packet before forwarding it upstream to indicate to upstream nodes that the CCN router 200 is going to cache the corresponding data packet in its CC 203.

Alternately or additionally, the CC 203 may include a count field in each of the entries for the data packets cached in the CC 203 and/or for a first data packet of each of multiple contents. A count value may be stored in the count field. Each time a particular data packet is requested, its count value may be incremented in the CC 203. An increase in the count value of a data packet may indicate that the data packet and the content to which it belongs are increasing in popularity among users. Accordingly, the CCN router 200 may begin to cache additional data packets belonging to the same content so that more of the content is cached closer to the users to reduce network congestion and delay. These and other aspects are discussed in more detail below.

Figure 2B:
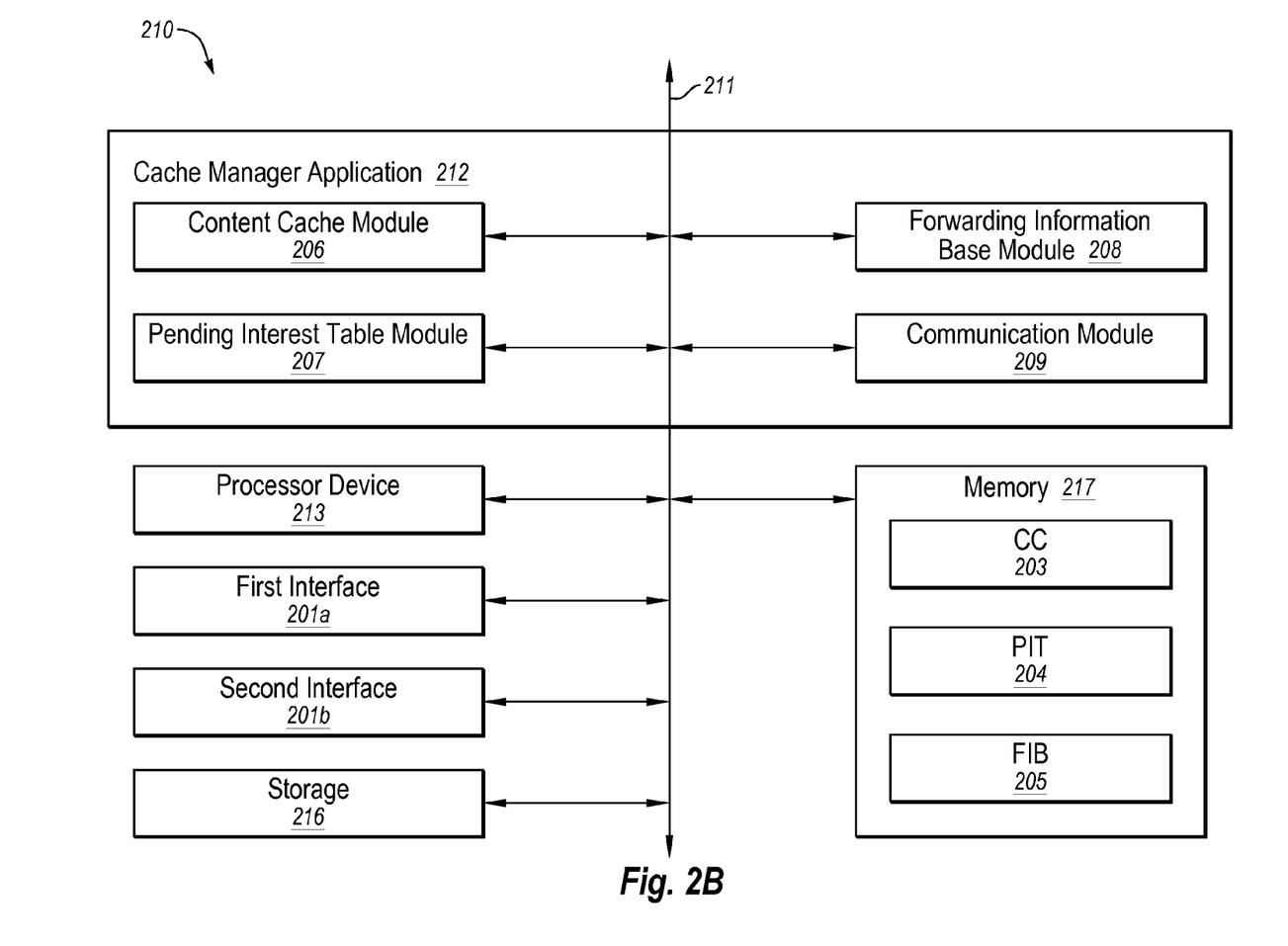
FIG. 2B is a block diagram illustrating an example CCN router system.

FIG. 2B is a block diagram illustrating an example CCN system (hereinafter "system 210"), arranged in accordance with at least one implementation described herein. The system 210 may be arranged for content placement along the delivery path of a network of nodes, in accordance with at least one implementation described herein and may be implemented as a computing device or system. The system 210 may include the CCN router 200 of FIG. 2A. Alternately or additionally, the system 210 may include or correspond to the intermediate nodes 104 and/or user nodes 102 of FIG. 1. For example, one or more of the intermediate nodes 104 and/or user nodes 102 may be implemented as the system 210. The system 210 may be implemented as a router or routing device or other device capable of routing as described herein.

The system 210 may include a cache manager application 212, a processor device 213, the first interface 201a, the second interface 201b, a storage 216, and a memory 217 according to some examples. The components of the system 210 may be communicatively coupled by a bus 211. The bus 211 may include, but is not limited to, a memory bus, a storage interface bus, a bus/interface controller, an interface bus, or the like or any combination thereof.

The processor device 213 includes an arithmetic logic unit, a microprocessor, a general-purpose controller, or some other processor array to perform or control performance of operations as described herein. The processor device 213 processes data signals and may include various computing architectures including a complex instruction set computer (CISC) architecture, a reduced instruction set computer (RISC) architecture, or an architecture implementing a combination of instruction sets. Although FIG. 2B includes a single processor device 213, multiple processor devices may be included. Other processors, operating systems, and physical configurations may be possible.

The memory 217 stores instructions and/or data that may be executed and/or operated on by the processor device 213. The instructions or data may include programming code that may be executed by the processor device 213 to perform or control performance of the operations described herein and/or may include the CC 203, PIT 204, and/or FIB 205 of FIG. 2A. The memory 217 may include a dynamic random access memory (DRAM) device, a static random access memory (SRAM) device, flash memory, or some other memory device. In some implementations, the memory 217 also includes a non-volatile memory or similar permanent storage and media including a hard disk drive, a floppy disk drive, a CD-ROM device, a DVD-ROM device, a DVD-RAM device, a DVD-RW device, a flash memory device, or some other mass storage for storing information on a more permanent basis.

The first interface 201a is configured to receive interest packets from and send data packets to at least one user node and/or intermediate node, as explained with respect to FIG. 2A. For example, the first interface 201a may be configured to receive interest packets from and send data packets to the user nodes 102 and intermediate nodes 104 of FIG. 1 and/or the downstream node 206 of FIG. 2A. The first interface 201a is described in more detail with respect to FIG. 2A.

The second interface 201b is configured to forward interest packets to and receive data packets from at least one intermediate node and/or content source node, as explained with respect to FIG. 2A. For example, the second interface 201b may be configured to send interest packets to and receive data packets from the intermediate nodes 104 and source node 103 of FIG. 1 and/or the upstream node 207 of FIG. 2A. The second interface 201b is described in more detail with respect to FIG. 2A.

In some implementations, the first and second interfaces 201a, 201b include a port for direct physical connection to other nodes in the CCN 100 of FIG. 1 or to another communication channel. For example, the first and second interfaces 201a, 201b may include a universal serial bus (USB) port, a secure digital (SD) port, a category 5 cable (CAT-5) port, or similar port for wired communication with at least one of the nodes 102-104 of FIG. 1. In some implementations, the first and second interfaces 201a, 201b include a wireless transceiver for exchanging data with at least one of the 102-104 of FIG. 1 or other communication channels using one or more wireless communication methods, including IEEE 802.11, IEEE 802.16, BLUETOOTH®, or another suitable wireless communication method.

In some implementations, the first and second interfaces 201a, 201b include a cellular communications transceiver for sending and receiving data over a cellular communications network including via short messaging service (SMS), multimedia messaging service (MMS), hypertext transfer protocol (HTTP), direct data connection, wireless application protocol (WAP), e-mail, or another suitable type of electronic communication. In some implementations, the first and second interfaces 201a, 201b may include a wired port and a wireless transceiver. The first and second interfaces 201a, 201b may also provide other connections to the CCN 100 of FIG. 1, for distribution of files or media objects using standard network protocols including transmission control protocol/internet protocol (TCP/IP), HTTP, HTTP secure (HTTPS), and simple mail transfer protocol (SMTP), etc.

The storage 216 may include a non-transitory storage medium that stores instructions and/or data for providing the functionality described herein. The storage 216 may include a dynamic random access memory (DRAM) device, a static random access memory (SRAM) device, flash memory, or some other memory devices. In some implementations, the storage 216 also includes a non-volatile memory or similar permanent storage and media including a hard disk drive, a floppy disk drive, a CD-ROM device, a DVD-ROM device, a DVD-RAM device, a DVD-RW device, a flash memory device, or some other mass storage for storing information on a more permanent basis. The storage 216 may also store instructions and/or data that are temporarily stored or loaded into the memory 217.

As illustrated in FIG. 2B, the cache manager application 212 may include at least one of: a content cache module 206 (hereinafter "CC module 206"), a pending interest table module 207 (hereinafter "PIT module 207"), a forwarding information base module 208 (hereinafter "FIB module 208"), and a communication module 209, collectively referred to herein as "modules." The cache manager application 212, including the modules 206-209, may generally include software that includes programming code and/or computer-readable instructions executable by the processor device 213 to perform or control performance of the functions and operations described herein. The cache manager application 212, including one or more of the modules 206-209, may receive data from one or more of the components of the system 210 and/or may store the data in one or both of the storage 216 and the memory 217.

The CC module 206 may generally be configured to associate interest packets with corresponding data packets that may be stored at the intermediate nodes, such as the intermediate nodes 104 of FIG. 1, as described in more detail herein.

The PIT module 207 may be configured to record and keep track of each received interest packet that is being served or pending (until the corresponding requested data packet is received) by associating each interest packet with one or more receiving interfaces, as described in more detail herein. In these and other implementations, the PIT module 207 may read data from and/or write data to the PIT 204.

The FIB module 208 may be configured to associate interest packets with one or more corresponding interfaces 201 on which the interest packet is received and forwarded, as described in more detail herein. The FIB module 208 may read data from and/or write data to the FIB 205.

The communication module 209 may be implemented as software including routines for handling communications between the modules 206-208 and other components of the system 210. The communication module 209 sends and receives data, via the interfaces 201, to and from one or more of the nodes 102-104 depending upon where the cache manager application 212 is implemented. In some implementations, the communication module 209 receives data from one or more of the modules 206-208 and stores the data in one or more of the storage 216 and the memory 217. In some implementations, the communication module 209 retrieves data from the storage 216 or the memory 217 and sends the data to one or more of the modules 206-208.

In an example implementation, the communication module 209 may receive multiple interest packets from a downstream node. The interest packets may identify some or all of the data packets of a content. For simplicity in the discussion that follows, first and second interest packets are discussed, with the understanding that more than two interest packets may be received. The first and second interest packets may respectively identify first and second data packets of multiple data packets that collectively form a content. The first data packet may include a portion of the content that occurs within the content prior to a portion of the content included in the second data packet. For instance, where the content includes a video or audio file, the first data packet may include a portion of the content that occurs at or closer to the beginning of the content than the portion of the content included in the second data packet.

In this and other implementations, the CC module 206 may check the CC 203 for the first and second data packets, and in response to the first and second data packets being absent from the CC 203, the PIT module 207 checks the PIT 204 for the first and second interest packets.

In response to the first and second interest packets being absent from the PIT 204 and a cache flag of the first interest packet received from the downstream node being off: the PIT module 207 records the first and second interest packets in the PIT 204; the PIT module 207 sets a cache flag of the first interest packet in the PIT 204; the FIB module 208 forwards the first and second interest packets to an upstream node with a cache flag in the first interest packet set to indicate that the first data packet identified by the first interest packet will be cached in the CC 203; the communication module 209 receives the first and second data packets from the upstream node; and the CC module 206 caches the first data packet in the CC 203. Where the content to which the first and second data packets belong is not very popular (e.g., where the first and second data packets have only been request once), the CC module 206 may only cache the first data packet without caching the second data packet.

Alternately, and in response to the first data packet being in the CC 203: the communication module 209 delivers the first data packet to the downstream node, and the CC module 206 increments a count value of the first data packet in the CC 203. The CC module 206 may determine, based on the count value of the first data packet, a number of additional data packets of the content to be stored in the CC 203. In some implementations, whatever the number of additional data packets that is determined, the additional data packets to be stored may include data packets that occur within the content following or immediately following data packets already stored in the CC 203. For instance, after the first data packet, the second data packet that occurs within the content immediately following the first data packet may be stored in the CC 203, followed by a third data packet that occurs within the content immediately following the second data packet, followed by a fourth data packet that occurs within the content immediately following the third data packet, and so on.

The determined number of data packets of the content are caused to be stored in the CC 203. For each of the determined number of data packets not already stored in the CC, this may be include the following: the PIT module 207 records a corresponding one of the interest packets that identifies the corresponding data packet in the PIT 204; the PIT module 207 sets a cache flag of the corresponding one of the interest packets in the PIT 204; the FIB module 208 forwards the corresponding one of the interest packets to an upstream node with a cache flag in the corresponding one of the interest packets set to indicate that the corresponding data packet identified by the corresponding one of the interest packets will be cached in the CC 203; and the CC module 206 caches the corresponding data packet in the CC 203.

In response to the first and second interest packets being absent from the PIT 204 and the cache flag of the first interest packet received from the downstream node being set at a time of receipt of the first interest packet from the downstream: the PIT module 207 records the first interest packet in the PIT 204 without setting the cache flag of the first interest packet in the PIT 204; and the communication module 209 forwards the interest packet to the upstream node.

The number of additional data packets to be stored in the CC 203 based on the count value may be determined according to any suitable formula or process. In an example implementation, the number of additional data packets may be determined as $2^{count\ value}$. Accordingly, if the first data packet is already in the CC 203 and has only been requested one time (e.g., by receipt of the first interest packet one time), the count value of the first data packet in the CC 203 may be zero. Each time the first interest packet is subsequently received, the count value may be incremented. For example, in response to a first subsequent receipt of the first interest packet, the count value may be incremented to 1, and since $2^1=2$, two additional data packets (e.g., the second and third data packets) of the content may be cached in the CC 203. As another example, in response to a second subsequent receipt of the first interest packet, the count value may be incremented to 2, and since $2^2=4$, a total of four additional data packets of the content may be cached in the CC 203; where the second and third data packets are already cached in the CC 203, only the fourth and fifth data packets of the content may need to be added at this point. As the count value increases, indicating increasing popularity of the content, additional data packets of the content may be cached in the CC 203.

Figure 3:
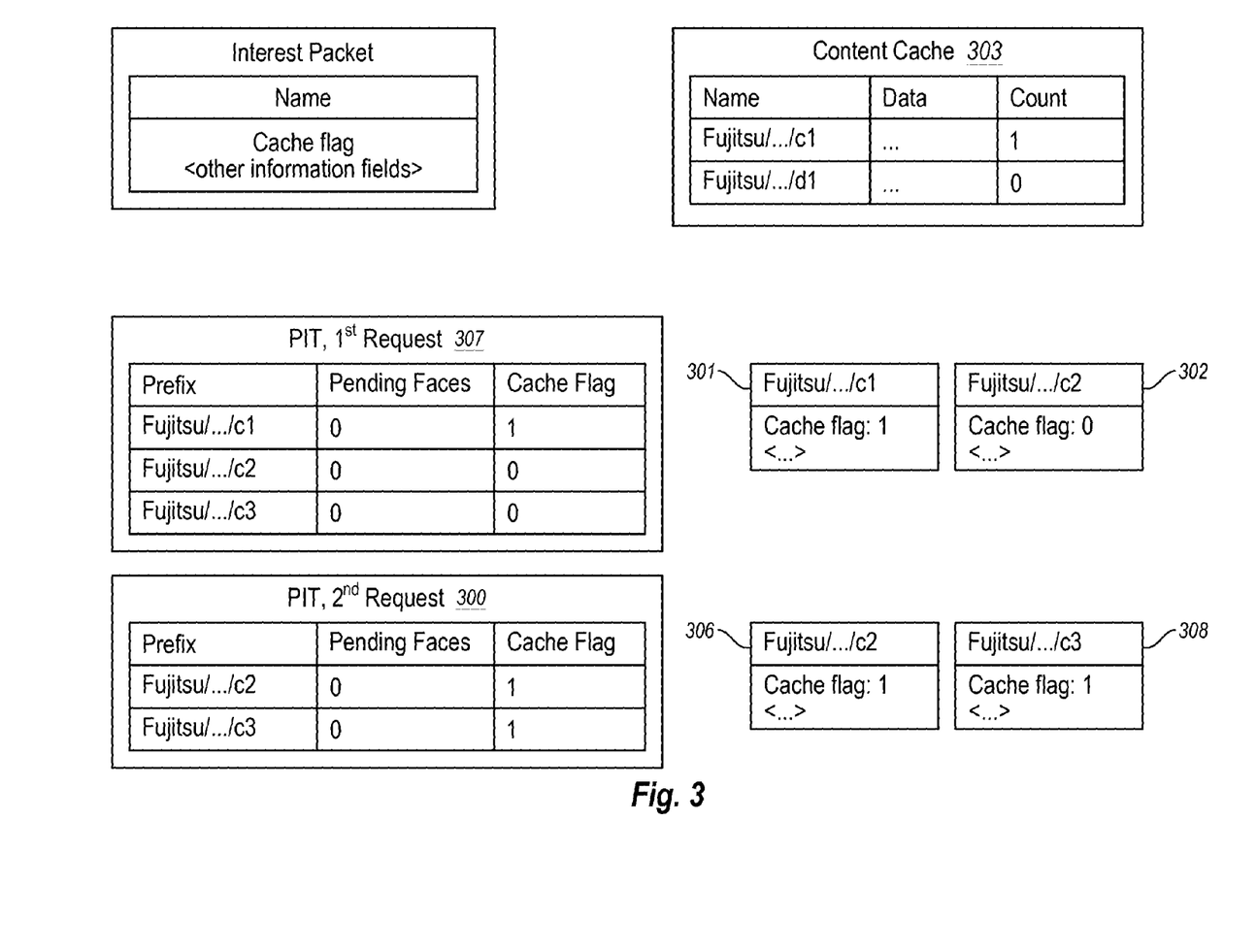
FIG. 3 is a schematic diagram illustrating a caching scheme in a router of a CCN.

FIG. 3 is a schematic diagram illustrating a caching scheme in an example CCN router, arranged in accordance with at least one implementation described herein. The CCN router may include or be included in the CCN router 200 of FIG. 2A and/or the system 200 of FIG. 2B. The CCN router of FIG. 3 may be implemented similar to the CCN router 200, for instance.

When a downstream user node seeks to stream a content hosted by a content source node, the user node may send interest packets that correspond to some or all of the data packets that collectively form the content. The downstream user node and content source node may correspond to the user node 102 and content source node 103 of FIG. 1, respectively. For simplicity, the example CCN router in FIG. 3 is assumed to receive three interest packets, c1, c2, and c3, that respectively identify first, second, and third data packets, where the first, second, and third data packets collectively form content c. Interest packet c1 corresponds to a request for the first data packet. Upon receiving a first request for the interest packets c1, c2, and c3, the router may check its CC for the corresponding data packets. In response to the data packets being absent from the CC, the router may check its PIT for the interest packets c1, c2, and c3. In response to the interest packets being absent from the PIT and cache flags of the interest packets c1, c2, and c3 being turned off, the router records the interest packets c1, c2, and c3 in the PIT, sets the cache flag of the interest packet c1 in the PIT without setting the cache flag of the interest packets c2 and c3 in the PIT, and forwards the interest packets c1, c2, and c3 to an upstream node with a cache flag in interest packet c1 301 set to indicate to the upstream node that the interest packet c1 will be cached in the CC of the CCN router of FIG. 3 after delivery. The state of the PIT in view of the foregoing is generally illustrated at 307. The cache flag in interest packet c2 302 and c3 (not shown) is not set. When the data packet corresponding to the interest packet c1 is received from the upstream node, it is cached in the CC of the CCN router of FIG. 3 and forwarded to the downstream node from which the interest packet c1 was received.

When the CCN router of FIG. 3 receives a second request from a downstream node for content c, e.g., including interest packets c1, c2, and c3, the first data packet identified by the interest packet c1, which is stored at the CCN router of FIG. 3, is delivered to the downstream node, and the count value of the first data packet corresponding to the interest packet c1 is incremented, as seen in CC 303. An exponential formula (or other suitable formula) may be implemented such that $2^n$ additional data packets of the content will be cached at the CCN router of FIG. 3, where n is the count value. For example, when the count value is 1 and at or around the time of the second request, interest packets c2 and c3 may be recorded in the PIT, the cache flags of the interest packets c2 and c3 may be set in the PIT, and interest packet c2 306 and interest packet c3 308 may be forwarded to an upstream node with cache flags set to indicate to the upstream node that the corresponding data packets will be cached at the router. The state of the PIT in view of the foregoing is generally illustrated at 300.

FIGS. 4A-4D are a schematic diagram illustrating a caching scheme among a network of nodes in a CCN, arranged in accordance with at least one implementation described herein. FIGS. 4A-4D will be described in turn. In FIGS. 4A-4D, downstream and upstream directions are labeled by arrows, where downstream corresponds to the direction from a content source node to a user node and upstream corresponds to the opposite direction from the user node to the content source node.

Figure 4A:
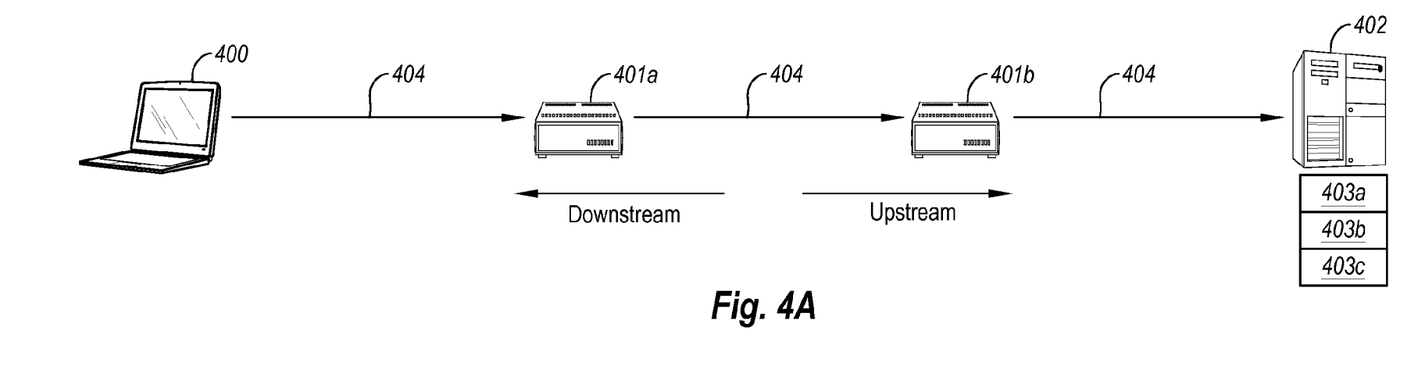
FIGS. 4A-4D are a schematic diagram illustrating a caching scheme among a network of nodes in a CCN.

In FIG. 4A, a first user at a user node 400 is communicatively coupled to a CCN (e.g., the Internet) via a first intermediate node 401a, which includes a CCN router. The user node 400 may request content c by sending interest packets c1, c2, and c3, which correspond to the data packets that collectively form content c, to the first intermediate node 401a. For simplicity, content c is assumed to consist of three pieces or data packets corresponding to interest packets c1, c2, and c3. The first intermediate node 401a may receive each of the interest packets c1, c2, and c3 from the user node 400. After checking a CC of the first intermediate node 401a for the data packets corresponding to c1, c2, and c3, and finding them absent, the first intermediate node 401a may check a PIT of the first intermediate node 401a for interest packets c1, c2, and c3. In response to the interest packets being absent from the PIT and a cache flag of the first interest packet c1 being off, the first intermediate node 401a may record interest packets c1, c2, and c3 in the PIT, set a cache flag for the first interest packet c1 in the PIT, and forward the interest packets c1, c2, and c3 upstream to a second intermediate node 401b via a forwarding path 404 toward a content source node 402. The second intermediate node 401b, currently having no data packets of content c in its CC, may then forward the interest packets c1, c2, and c3 to the content source node 402, which may include a server. The content source node 402 may host a first data packet 403a corresponding to interest packet c1, a second data packet 403b corresponding to interest packet c2, and a third data packet 403c corresponding to interest packet c3. The data packets 403a-403c are collectively referred to herein as data packets 403.

Figure 4B:
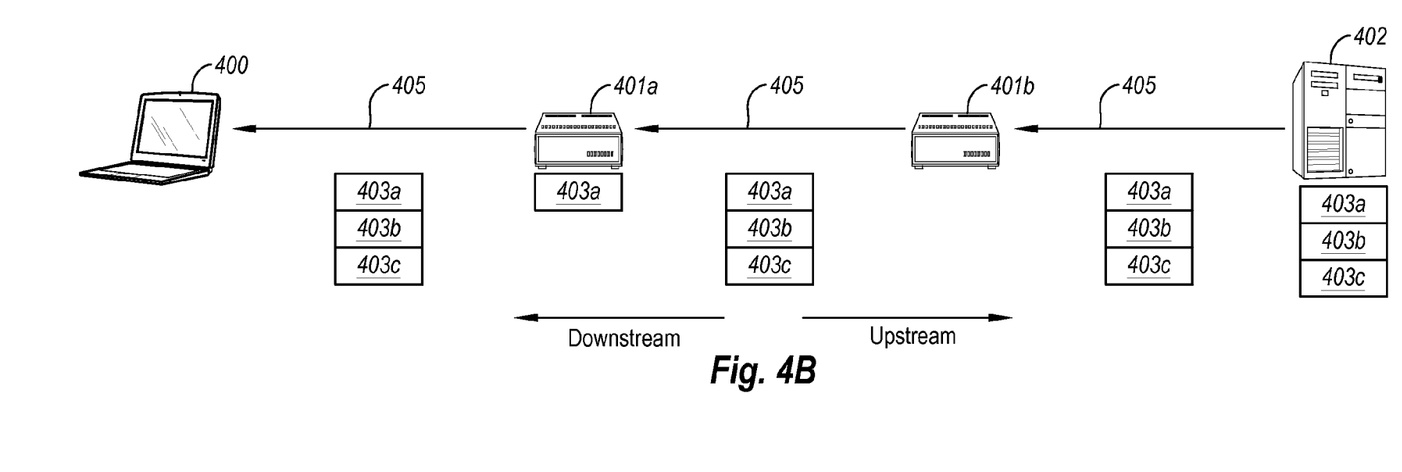

In FIG. 4B, the content source node 402 may then return the data packets 403 to the user node 400 via a reverse path 405. Data packets 403 may not be cached at the second intermediate node 401b if a cache flag was not set in the PIT of the second intermediate node 401b for any corresponding interest packets. However, the first intermediate node 401a will receive the first, second, and third data packets 403, forward them to the user node 400, and cache the first data packet 403a in the CC of the first intermediate node 401a. The reverse path 405 of FIG. 4B is an example of a delivery path in a CCN network.

Figure 4C:
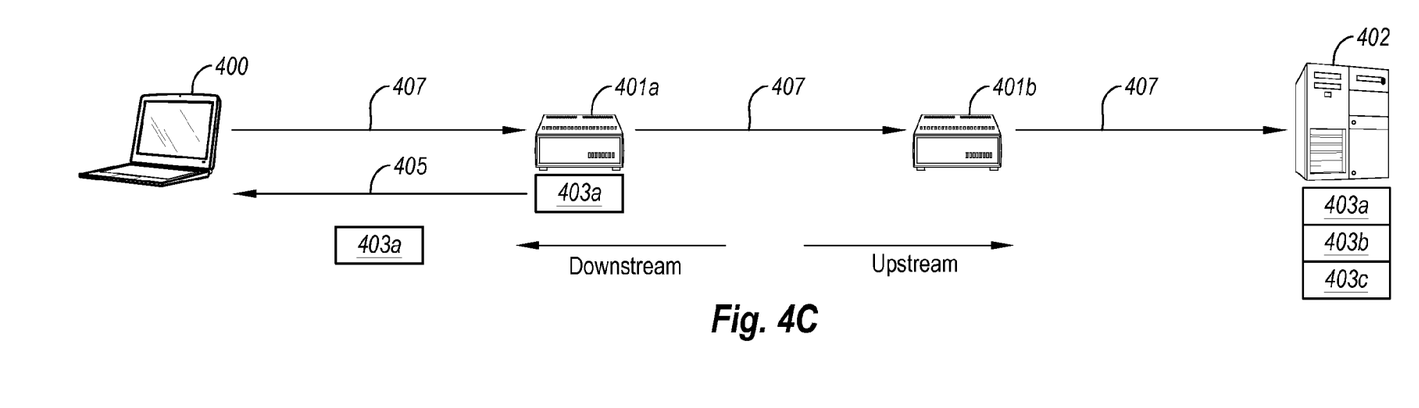

In FIG. 4C, a second user at a second user node 406 may be communicatively coupled to the CCN (e.g., the Internet) via the first intermediate node 401a. The second user node 406 may request the same content c by sending interest packets c1, c2, and c3, which may correspond to the data packets 403 that collectively form content c, to the first intermediate node 401a. In response to the first data packet 403a corresponding to interest packet c1 being in the CC of the first intermediate node 401a, the first intermediate node 401a may deliver the first data packet 403a corresponding to the interest packet c1 to the second user node 406. The first intermediate node 401a may also increment a count value of the first data packet 403a in its CC. In this example, the first data packet 403a has been delivered one time, and the count value may be, but is not limited to, a value of one. Based on the count value, the first intermediate node 401 a may determine a number of additional data packets of the content c to be stored in the CC. Given a count value of one, the first intermediate node 401a may cause $2^{count\ value}$ or two additional data packets of content c to be stored in the CC. For each of the determined number of data packets not already stored in the CC of the first intermediate node 401a, e.g. the second and third data packets 403b and 403c, the first intermediate node 401a may cause them to be stored in the CC, including: recording each of interest packets c2 and c3 in its PIT, setting a cache flag for each of interest packets c2 and c3 in its PIT, and forwarding the interest packets c2 and c3 with cache flags set to an upstream node such as the second intermediate node 401b via a forwarding path 407 toward the content source node 402. In response to receiving the interest packets c2 and c3 with cache flags set, the second intermediate node 401b may forward them to the content source node 402 and may only record the interest packets c2 and c3 if they are absent from its PIT.

Figure 4D:
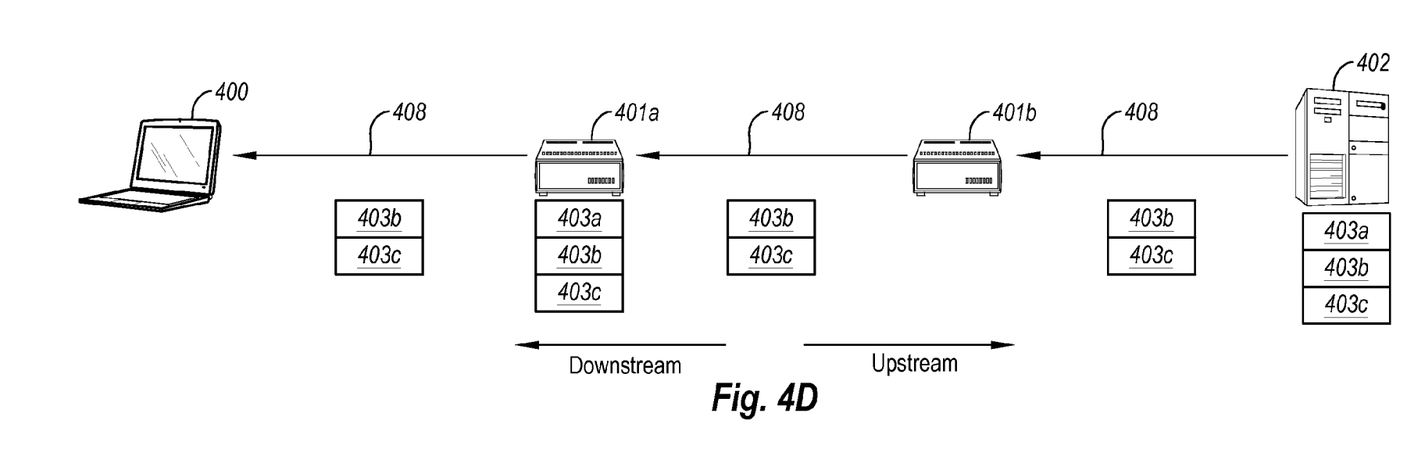

In FIG. 4D, the second and third data packets 403b and 403c corresponding to interest packets c2 and c3 may continue along a reverse path 408 from the content source node 402 to the first intermediate node 401a. The first intermediate node 401a may store the second and third data packets 403b and 403c as a result of the actions described with respect to FIG. 4C. The reverse path 408 of FIG. 4D is an example of a delivery path in a CCN network.

Figure 5:
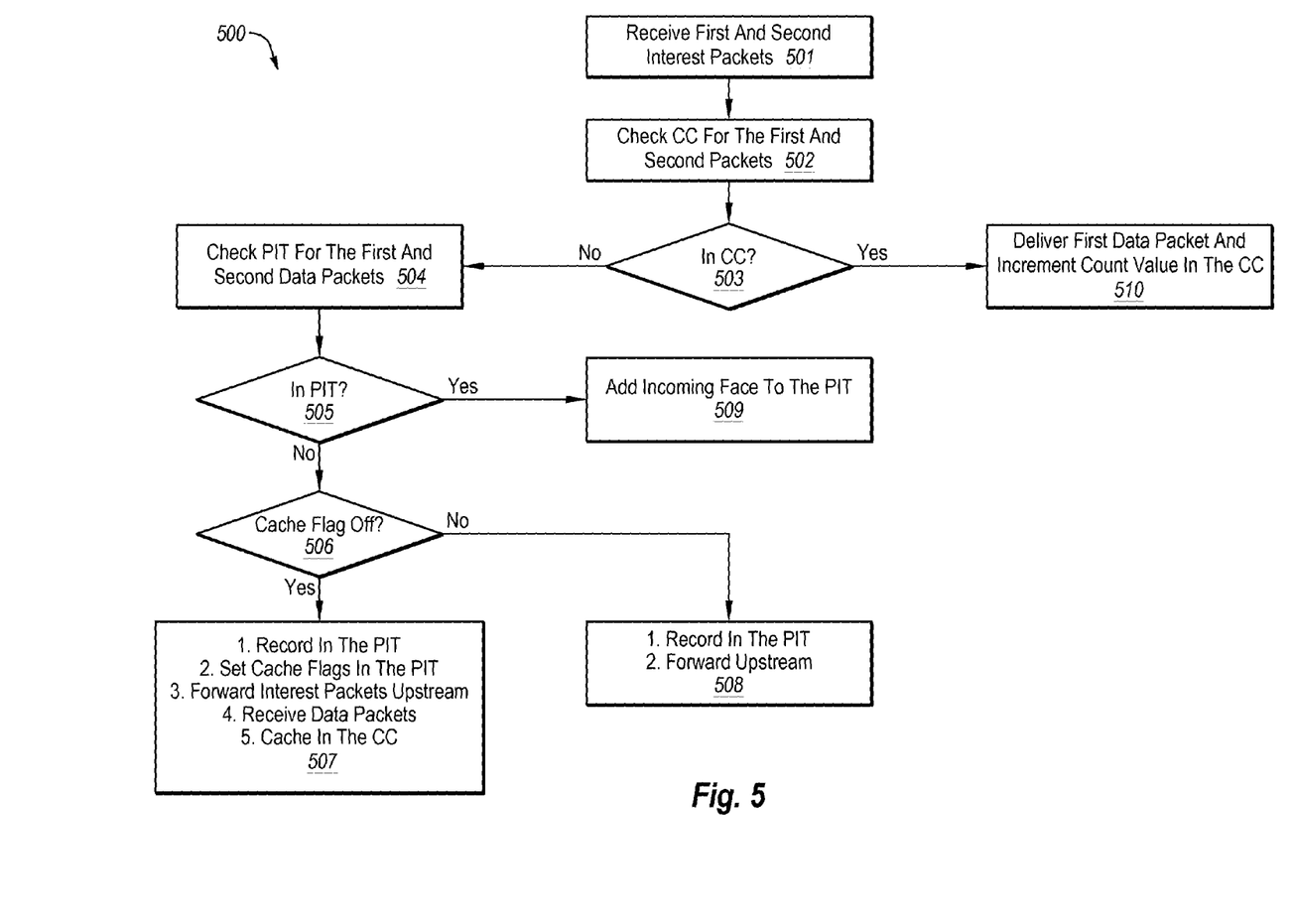
FIG. 5 is an example flow diagram of a method for content placement along the delivery path of a network of nodes in a CCN.

FIG. 5 is an example flow diagram of a method 500 for content placement along the delivery path of a network of nodes in a CCN. The method 500 may be implemented, in whole or in part, by one or more intermediate nodes 104 of FIG. 1, the CCN router of 2A, the system 210 of FIG. 2B, one or both of the intermediate nodes 401a and 401b of FIGS. 4A-4D, or another suitable network node, CCN router, and/or system. The method 500 may begin at block 501.

In block 501, a first node, such as a CCN router, receives first and second interest packets from a downstream node. The downstream node may include a user node, such as either of the user nodes 102 of FIG. 1, or an intermediate node, such as any of the intermediate nodes 104 of FIG. 1. The first and second interest packets respectively identify first and second data packets of multiple data packets that collectively form a content. While only first and second packets are discussed in the context of FIG. 5 for simplicity, the first node may receive more than two interest packets from a downstream node. The first node also may receive up to all the interest packets that identify the data packets that collectively form the content. Block 501 may be followed by block 502.

In block 502, the first node checks its CC for the first and second data packets. The first node may check its CC for the first and second data packets using a CC cache module, such as the CC module 206 of FIG. 2B. The CC of the first node may include the CC 203 of FIGS. 2A-2B. Block 502 may be followed by block 503.

In block 503, the first node may determine if the first and/or second data packets are in the CC of the first node. Block 503 may be followed by block 504 if the first and second data packets are absent from the CC of the first node ("No" at block 503) or by block 510 if the first data packet and/or the second data packet are in the CC of the first node ("Yes" at block 503).

In block 510, in response to the first data packet being in the CC of the first node, the first node will deliver the first data packet to the downstream node and increment a count value of the first data packet in the content cache. Alternately or additionally, in response to the second data packet also being in the CC of the first node, the first node will deliver the second data packet to the downstream node. The first and/or second data packets may be delivered by a communication module of the first node, such as the communication module 209 of FIG. 2B, and the count value may be incremented by a CC module of the first node, such as the content cache module 206 of FIG. 2B.

At block 504, and in response to the first and second data packets being absent from the content cache at block 503, the first node may check its PIT for the first and second interest packets. The first node may check its PIT using a PIT module, such as the PIT module 207 of FIG. 2B. The PIT of the first node may include the PIT 204 of FIGS. 2A-2B. Block 504 may be followed by block 505.

In block 505, the first node may determine if the first and second interest packets are in its PIT. Block 505 may be followed by block 506 ("No" at block 505) or by block 509 ("Yes" at block 505).

In block 509, in response to the first and second interest packets being in the PIT of the first node, the first node may add an incoming face of each of the first and second interest packets to the PIT of the first node and wait to receive the first and second data packets identified by the first and second interest packets. Although not illustrated in FIG. 5, following block 509, the method 500 may further include receiving the first and second data packets and sending the first and second data packets out of each of the faces listed for the first and second interest packets in the PIT of the first node. The first node may add the first and second interest packets to the PIT of the first node using a PIT module of the first node, such by the PIT module 207 of FIG. 2B.

In block 506, the first node may determine if a cache flag of the first interest packet received from the downstream node is off. Block 506 may be followed by block 507 ("No" at block 506) or by block 508 ("Yes" at block 506).

In block 507, in response to the first and second interest packets being absent from the PIT of the first node and a cache flag of the first interest packet received from the downstream node being off, the first node may: 1) record the first and second interest packets in the PIT of the first node; 2) set a cache flag of the first interest packet in the PIT of the first node; 3) forward the first and second interest packets to an upstream node with a cache flag in the first interest packet set to indicate that the first data packet identified by the first interest packet will be cached in the content cache of the first node and without setting the cache flag in the second interest packet; 4) receive the first and second data packets from the upstream node; and 5) cache the first data packet in the CC of the first node. Alternately or additionally, the data packets received from the upstream node may be forwarded downstream from the corresponding faces identified in the PIT of the first node. The performance of each of the foregoing may be accomplished by one or more corresponding modules of the first node, which modules may include modules such as the modules 206-209 of FIG. 2B.

In block 508, in response to the first and second interest packets being absent from the PIT of the first node and the cache flag of the first interest packet received from the downstream node already being set at a time of receipt of the first interest packet, the first node may: 1) record the first interest packet in the PIT of the first node without setting the cache flag of the first interest packet in the PIT of the first node; and 2) forward the first interest packet to the upstream node.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed implementations.

For example, the method 500 may further include the first node receiving interest packets of at least some others of the data packets, determining, based on count value, a number of data packets of the content to be stored in the CC of the first node, and causing the determined number of data packets of the content to be stored in the CC of the first node. Causing the determined number of data packets of the content to be stored in the CC of the first node may include, for each of the determined number of data packets not already stored in the CC: 1) recording a corresponding one of the interest packets that identifies the corresponding data packet in the PIT of the first node; 2) setting a cache flag of the corresponding one of the interest packets in the PIT of the first node; 3) forwarding the corresponding one of the interest packets to an upstream node with a cache flag in the corresponding one of the interest packets set to indicate that the corresponding data packet identified by the corresponding one of the interest packets will be cached in the CC of the first node; and 4) caching the corresponding data packet in the CC of the first node.

Alternately or additionally, the method 500 may include implementing a replacement policy based on a larger index of the least recently or least frequently used content The replacement policy may be implemented in response to the CC of the first node being full and the first node receiving a data packet that it indicated would be cached in the CC of the first node. The index may indicate the proximity of a data packet to the beginning of the corresponding content. For example, a first data packet of a content (e.g., the first data packet at the beginning of the content) may have a relatively low index, such as an index of 1. The next data packet of the content, or the second data packet in this example, may have a higher index, such as an index of 2. The next data packet of the content, or the third data packet in this example, may have a higher index, such as an index of 3. The index of each data packet of the content may be higher than the index of the preceding data packet of the same content.

In these and other implementations, the method 500 may implement the replacement policy, which may include replacing data packets stored in the CC of the first node according to both an index of the data packets and one of how recently the corresponding content is requested or how frequently the corresponding content is requested. The recency and/or frequency of requests for content may be tracked by using timestamps in the CC and/or the PIT of the first node for each interest packet and/or data packet and/or using the count value of each of the first data packets, that belong to different contents, stored in the CC of the first node.

Replacing data packets according to both an index of the data packets and how recently the corresponding content is requested may include, in response to the CC of the first node being full when the first data packet is received from the upstream node: (1) identifying a least recently requested content, from among multiple contents that have at least one data packet stored in the CC of the first node, for which an interest packet has been received less recently than the other contents that have at least one data packet stored in the CC of the first node, (2) identifying a data packet as having a largest index of any other data packets of the least recently requested content that are stored in the CC of the first node, and (3) replacing the identified data packet in the content cache of the first node with the first data packet.

Replacing data packets according to both an index of the data packets and how frequently the corresponding content is requested may include, in response to the CC of the first node being full when the first data packet is received from the upstream node: (1) identifying a least frequently requested content, from among multiple contents that have at least one data packet stored in the CC of the first node, for which an interest packet has been received less frequently than the other contents that have at least one data packet stored in the CC of the first node, (2) identifying a data packet as having a largest index of any other data packets of the least frequently requested content that are stored in the CC of the first node, and (3) replacing the identified data packet in the content cache of the first node with the first data packet.

The implementations described herein may include the use of a special purpose or general purpose computer including various computer hardware or software modules, as discussed in greater detail below.

Implementations described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although implementations of the present inventions have been described in detail, it should be understood that the various changes, substitutions, and alterations could be made hereto without departing from the spirit and scope of the invention.

What is claimed is:

1. A method, comprising:
receiving first and second interest packets from a downstream node of a plurality of nodes of a network, wherein the first and second interest packets respectively identify first and second data packets of a plurality of data packets that collectively form a content;
checking a content cache of a first node of the plurality of nodes for the first and second data packets;
in response to the first and second data packets being absent from the content cache, checking a pending interest table of the first node for the first and second interest packets; and
in response to the first and second interest packets being absent from the pending interest table of the first node and a cache flag of the first interest packet received from the downstream node being off:
recording the first and second interest packets in the pending interest table;
setting a cache flag of the first interest packet in the pending interest table;
forwarding the first and second interest packets to an upstream node of the plurality of nodes with a cache flag in the first interest packet set to indicate that the first data packet identified by the first interest packet will be cached in the content cache of the first node;
receiving the first and second data packets from the upstream node; and
caching the first data packet in the content cache of the first node.

2. The method of claim 1, further comprising:
in response to the first data packet being in the content cache:
delivering the first data packet to the downstream node; and
incrementing a count value of the first data packet in the content cache;
receiving interest packets of at least some others of the plurality of data packets;
determining, based on the count value, a number of data packets of the content to be stored in the content cache; and
causing the determined number of data packets of the content to be stored in the content cache, including, for each of the determined number of data packets not already stored in the content cache:
recording a corresponding one of the interest packets that identifies the corresponding data packet in the pending interest table;
setting a cache flag of the corresponding one of the interest packets in the pending interest table;
forwarding the corresponding one of the interest packets to the upstream node with a cache flag in the corresponding one of the interest packets set to indicate that the corresponding data packet identified by the corresponding one of the interest packets will be cached in the content cache of the first node;
receiving the corresponding data packet; and
caching the corresponding data packet in the content cache of the first node.

3. The method of claim 2, wherein causing the determined number of data packets of the content to be stored in the content cache comprises causing $2^{count\ value}$ additional data packets of the content to be stored in the content cache.

4. The method of claim 1, further comprising, in response to the first and second interest packets being absent from the pending interest table of the first node and the cache flag of the first interest packet received from the downstream node being already set at a time of receipt of the first interest packet:
recording the first interest packet in the pending interest table without setting the cache flag of the first interest packet in the pending interest table; and
forwarding the first interest packet to the upstream node.

5. The method of claim 1, further comprising replacing a data packet stored in the content cache with the first data packet according to both an index of the data packet and how recently a content to which the data packet belongs is requested.

6. The method of claim 5, wherein replacing the data packet stored in the content cache with the first data packet according to both the index of the data packet and how recently the data packet is requested comprises, in response to the content cache of the first node being full:
identifying a least recently requested content, from among multiple contents that have at least one data packet stored in the content cache of the first node, for which an interest packet has been received less recently than the other contents that have at least one data packet stored in the content cache of the first node;
identifying the data packet as having a largest index of any other data packets of the least recently requested content that are stored in the content cache of the first node; and
replacing the data packet in the content cache of the first node with the first data packet.

7. The method of claim 1, further comprising replacing a data packet stored in the content cache with the first data packet according to both an index of the data packet and how frequently a content to which the data packet belongs is requested.

8. The method of claim 7, wherein replacing the data packet stored in the content cache with the first data packet according to both the index of the data packet and how frequently the content to which the data packet belongs is requested comprises:
identifying a least frequently requested content, from among multiple contents that have at least one data packet stored in the content cache of the first node, for which an interest packet has been received less frequently than the other contents that have at least one data packet stored in the content cache of the first node;
identifying the data packet as having a largest index of any other data packets of the least frequently requested content that are stored in the content cache of the first node; and
replacing the data packet in the content cache of the first node with the first data packet.

9. A network system, comprising:
a plurality of nodes along a delivery path between a content source and an end device, wherein the plurality of nodes are configured to diffuse a plurality of data packets of a content along the delivery path, including a first node of the plurality of nodes being configured to:
receive first and second interest packets from a downstream node of the plurality of nodes, wherein the first and second interest packets respectively identify first and second data packets of the plurality of data packets that collectively form the content;
check a content cache of the first node for the first and second data packets;
in response to the first and second data packets being absent from the content cache, check a pending interest table of the first node for the first and second interest packets; and
in response to the first and second interest packets being absent from the pending interest table of the first node and a cache flag of the first interest packet received from the downstream node being off:
record the first and second interest packets in the pending interest table;
set a cache flag of the first interest packet in the pending interest table;
forward the first and second interest packets to an upstream node of the plurality of nodes with a cache flag in the first interest packet set to indicate that the first data packet identified by the first interest packet will be cached in the content cache of the first node;
receive the first and second data packets from the upstream node; and
cache the first data packet in the content cache of the first node.

10. The system of claim 9, wherein in response to the first data packet being in the content cache, the first node is further configured to:
deliver the first data packet to the downstream node;
increment a count value of the first data packet in the content cache;
receive interest packets of at least some others of the plurality of data packets; and
determine, based on the count value, a number of data packets of the content to be stored in the content cache; and
cause the determined number of data packets of the content to be stored in the content cache, including, for each of the determined number of data packets not already stored in the content cache:
record a corresponding one of the interest packets that identifies the corresponding data packet in the pending interest table;
set a cache flag of the corresponding one of the interest packets in the pending interest table;
forward the corresponding one of the interest packets to the upstream node with a cache flag in the corresponding one of the interest packets set to indicate that the corresponding data packet identified by the corresponding one of the interest packets will be cached in the content cache of the first node;
receive the corresponding data packet; and
cache the corresponding data packet in the content cache of the first node.

11. The system of claim 10, wherein the first node is configured to cause the determined number of data packets of the content to be stored in the content cache by being configured to cause $2^{count\ value}$ data packets of the content to be stored in the content cache.

12. The system of claim 9, wherein in response to the first and second interest packets being absent from the pending interest table of the first node and the cache flag of the first interest packet received from the downstream node being already set at a time of receipt of the first interest packet, the first node is further configured to:
record the first interest packet in the pending interest table without setting the cache flag of the first interest packet in the pending interest table; and
forward the first interest packet to the upstream node.

13. The system of claim 9, wherein the first node is further configured to replace a data packet stored in the content cache according to how recently the data packet is requested.

14. The system of claim 9, wherein the first node is further configured to replace a data packet stored in the content cache according to how frequently the data packet is requested.

15. A non-transitory computer-readable medium that includes computer-readable instructions stored thereon that are executable by a processor to perform or control performance of operations comprising:
receiving first and second interest packets from a downstream node of a plurality of nodes of a network, wherein the first and second interest packets respectively identify first and second data packets of a plurality of data packets that collectively form a content;
checking a content cache of a first node of the plurality of nodes for the first and second data packets;
in response to the first and second data packets being absent from the content cache, checking a pending interest table of the first node for the first and second interest packets; and
in response to the first and second interest packets being absent from the pending interest table of the first node and a cache flag of the first interest packet received from the downstream node being off:
recording the first and second interest packets in the pending interest table;
setting a cache flag of the first interest packet in the pending interest table;
forwarding the first and second interest packets to an upstream node of the plurality of nodes with a cache flag in the first interest packet set to indicate that the first data packet identified by the first interest packet will be cached in the content cache of the first node;
receiving the first and second data packets from the upstream node; and
caching the first data packet in the content cache of the first node.

16. The non-transitory computer-readable medium of claim 15, wherein the operations further comprise, in response to the first data packet being in the content cache:
delivering the first data packet to the downstream node;
incrementing a count value of the first data packet in the content cache;
receiving interest packets of at least some others of the plurality of data packets; and
determining, based on the count value, a number of data packets of the content to be stored in the content cache; and
causing the determined number of data packets of the content to be stored in the content cache, including, for each of the determined number of data packets not already stored in the content cache:
recording a corresponding one of the interest packets that identifies the corresponding data packet in the pending interest table;
setting a cache flag of the corresponding one of the interest packets in the pending interest table;
forwarding the corresponding one of the interest packets to the upstream node with a cache flag in the corresponding one of the interest packets set to indicate that the corresponding data packet identified by the corresponding one of the interest packets will be cached in the content cache of the first node;

receiving the corresponding data packet; and caching the corresponding data packet in the content cache of the first node.

17. The non-transitory computer-readable medium of claim 16, wherein causing the determined number of data packets of the content to be stored in the content cache comprises causing $2^{count\ value}$ data packets of the content to be stored in the content cache.

18. The non-transitory computer-readable medium of claim 15, further comprising, in response to the first and second interest packets being absent from the pending interest table of the first node and the cache flag of the first interest packet received from the downstream node being already set at a time of receipt of the first interest packet:

recording the first interest packet in the pending interest table without setting the cache flag of the first interest packet in the pending interest table; and forwarding the first interest packet to the upstream node.

19. The non-transitory computer-readable medium of claim 15, further comprising replacing a data packet stored in the content cache according to how recently the data packet is requested.

20. The non-transitory computer-readable medium of claim 15, further comprising replacing a data packet stored in the content cache according to how frequently the data packet is requested.

* * * * *